United States Patent [19]

Akasu

[11] Patent Number: 5,489,149
[45] Date of Patent: Feb. 6, 1996

[54] OPTICAL DISTANCE MEASUREMENT APPARATUS PROVIDED WITH SMEAR DETECTOR DEVICE

[75] Inventor: Masahira Akasu, Himeji, Japan

[73] Assignee: Mitsubishi Denki Kabushiki Kaisha, Tokyo, Japan

[21] Appl. No.: 221,778

[22] Filed: Apr. 1, 1994

[30] Foreign Application Priority Data

Apr. 5, 1993 [JP] Japan ................................. 5-078195

[51] Int. Cl.$^6$ ............................. G01C 3/00; G01C 5/00
[52] U.S. Cl. ......................... 356/5.01; 356/4.01; 356/5.1
[58] Field of Search ........................ 356/4.01, 5.01–5.15

[56] References Cited

U.S. PATENT DOCUMENTS

| 4,511,249 | 4/1985 | Frungel et al. . |
| 5,337,137 | 8/1994 | Ogawa et al. . |

FOREIGN PATENT DOCUMENTS

| 0122609 | 10/1984 | European Pat. Off. . |
| 55-66738 | 5/1980 | Japan . |
| 149984 | 8/1985 | Japan . |

OTHER PUBLICATIONS

Derwent Abstract, DE 3,619,209.

Primary Examiner—Stephen C. Buczinski
Attorney, Agent, or Firm—Sughrue, Mion, Zinn, Macpeak and Seas

[57] ABSTRACT

An optical distance measurement apparatus for measuring the distance to an object 7 on the basis of the round-trip time of the light to and from the object. 7 includes an object detector means 32 and a smear detector means 33. The smear detector means 33 detects a smear when the ratio of unsuccessful measurements (i.e., the measurements by which no object is detected) is greater than or equal to a predetermined level. Alternatively, the number of successive measurements of a distance less than a predetermined threshold level (e.g., 50 meters) is stored in a counter, and the smear is detected when the content of the counter becomes greater than or equal to a predetermined number.

6 Claims, 9 Drawing Sheets

OPTICAL DISTANCE MEASUREMENT APPARATUS PROVIDED WITH SMEAR DETECTOR DEVICE

BACKGROUND OF THE INVENTION

This invention relates to optical distance measurement apparatus for determining the distance to an object on the basis of the round-trip time of the light radiated from the apparatus and reflected by the object, and more particularly to the smear detector device for detecting the smear upon the windows in the light emitting and receiving path of the optical distance measurement apparatus.

FIG. 9 is a block diagram showing a conventional smear detector device for an optical distance measurement apparatus, which is disclosed, for example, in Japanese Patent Publication (Kokoku) No. 3-30116. The light emitted from the light emitter unit 1 is radiated on an object 7. The light emitter unit 1 includes a laser diode 11, a pulse driver circuit 12 and a emitter lens 13. The laser diode 11 is driven by the pulse driver circuit 12 to generate pulses of light, which is converged by the emitter lens 13 toward the object 7. The light reflected from the object 7 is received by a light receiver unit 2. The received light is converged by a receiver lens 21 upon a light receiving element 22. A processing circuit 3 calculates the distance to the object 7 based on the measurement of the interval of time between the excitation of the laser diode 11 by means of the pulse driver circuit 12 and the detection of the reflected light by means of the light receiving element 22. Transparent glass plates are positioned in front of the light emitter unit 1 and the light receiver unit 2, respectively, to form a emitter window 4 and a receiver window 5.

A smear detector unit 6 detects the blur or smear attached, for example, upon the emitter window 4. A light receiver element 61 receives the light scattered by the emitter window 4 and guided through a shield 63, and generates an electrical signal corresponding to the intensity of the received light. A smear detection processing circuit 62 detects the smear on the emitter window 4 on the basis of the level of the electrical signal that is output from the light receiver element 61.

Next, the operation of the apparatus of FIG. 9 is described. When excited by the pulse driver circuit 12, the laser diode 11 outputs a pulsed laser light. The laser light is converged by the processing circuit 3 and emitted forward through the emitter window 4. If an object 7 exists in front of the apparatus, the light reflected by the object 7 is received by the light receiver unit 2 through the receiver window 5. The received light is converged by the receiver lens 21 upon the light receiving element 22, which effects the photoelectric conversion to obtain an electrical signal corresponding to the intensity of the received light.

The processing circuit 3 compares the signal output from the light receiver unit 2 with a threshold level, and, if the signal level is greater than the threshold level, the processing circuit 3 judges that the signal corresponds to the light reflected from the object 7. Further, using a high-speed counter (not shown), the processing circuit 3 measures the time interval between the excitation of the emitter lens 13 by the pulse driver circuit 12 and the reception of the light at the light receiving element 22. The measurement corresponds to the round-trip time in which the laser light goes forward from the apparatus to the object 7 and thence backward to the apparatus. Finally, the processing circuit 3 determines the distance between the apparatus and the object 7 from the round-trip time, using the following formula:

$$(\text{DISTANCE}) = (\text{ROUND-TRIP TIME}) \cdot (\text{LIGHT SPEED})/2 \quad \ldots (1)$$

The smear detector unit 6, on the other hand, receives the light scattered at the inner and outer interfaces of the emitter window 4, and outputs an electrical signal corresponding to the intensity of the scattered light. The intensity of the scattered light corresponds to the amount of smear attached on the emitter window 4. Thus, the smear detection processing circuit 62 judges that the emitter window 4 is not smeared or blurred if the output of the light receiver element 61 is below a predetermined level. If, on the other hand, the output of the light receiver element 61 exceeds the predetermined level, the smear detection processing circuit 62 judges that the emitter window 4 is smeared and outputs a smear detection signal.

The smear detector device of FIG. 9, however, has the following disadvantage. Namely, the light scattered by the smear upon the emitter window 4, etc., is guided to the light receiver element 61 via the shield 63. The smear is detected on the basis of the intensity of the scattered light received on the light receiver element 61. Thus, the smear detection area is limited by the shield 63 within the region of the emitter window 4 on which the light is radiated. The smear detection may thus become unreliable as described next.

If the smear is spread uniformly over the emitter window 4, the level of the scattered light corresponds to the amount of smear which interferes with the distance detection. If, however, the smear is concentrated to a region outside of the smear detection area, the level of the scattered light detected by the light receiver element 61 remains low although a significant part of the light radiated from the light emitter unit 1 is scattered by the emitter window 4. The sensitivity of the smear detection thus deteriorates. On the other hand, if the smear is concentrated within the smear detection area, the level of the scattered light detected by the light receiver element 61 becomes higher than level corresponding to the overall amount of the smear attached upon the emitter window 4. The smear detector device thus becomes hypersensitive.

Further disadvantage of the smear detector device of FIG. 9 is that the smear detector device should be provided with a separate light receiver element 61 and a separate smear detection processing circuit 62. The device is thus expensive.

SUMMARY OF THE INVENTION

It is therefore a primary object of this invention to provide an optical distance measurement apparatus provided with a reliable and accurate smear detector device by which a separate light receiving element, etc., is not necessary.

The above object is accomplished in accordance with this invention by an optical distance measurement apparatus including: light transmitter means for radiating light toward an object a distance to which is to be measured; light receiver means for receiving the light radiated from the light transmitter means and reflected by the object, the light receiver means generating a signal corresponding to a received light; distance measurement means, coupled to the light transmitter means and the light receiver means, for determining a distance to the object periodically on the basis of a round-trip time of the light travelling forward from the light transmitter means to the object and backward from the object to the light receiver means; object detector means, coupled to the light receiver means, for determining whether or not an object is detected on the basis of a level of the signal output from the light receiver means; and smear detector means, coupled to the object detector means, for calculating a ratio of a number of measurements by which the object is not detected to a total number of measurements made periodically by the distance measurement means over a predetermined length of time, wherein the smear detector means detects a smear when the ratio is greater than or equal to a predetermined level.

Alternatively, the optical distance measurement apparatus may include: light transmitter means for radiating light toward an object a distance to which is to be measured; light receiver means for receiving the light radiated from the light transmitter means and reflected by the object, the light receiver means generating a signal corresponding to a received light; distance measurement means, coupled to the light transmitter means and the light receiver means, for determining a distance to the object periodically on the basis of a round-trip time of the light travelling forward from the light transmitter means to the object and backward from the object to the light receiver means; counter means, coupled to the distance measurement means, for storing a number of successive measurements of a distance less than a predetermined threshold level, the measurements being performed by the distance measurement means; and smear detector means, coupled to the counter means, for detecting a smear when a content of the counter means becomes greater than or equal to a predetermined number.

Preferably, the optical distance measurement apparatus further includes: an object identity detector for determining whether or not a first object a distance to which is measured in a current measurement cycle by the distance measurement means is identical to a second object a distance to which is measured by the distance measurement means in an immediately preceding measurement cycle; wherein the counter means is further coupled to the object identity detector and is incremented upon each successive measurement of a distance less than the predetermined threshold level only if the object identity detector determines that the first object is not identical to the second object. The object identity detector may determine that the first object is identical to the second object if and only if a variation of a relative movement of the first and second object with respect to the optical distance measurement apparatus over the current and the preceding measurement cycles is substantially equal to zero.

It is further preferred that the optical distance measurement apparatus further includes: threshold level modifier means, coupled to the smear detector means, for modifying the predetermined threshold level from a first to a second level greater than the first level when the smear detector means detects the smear. The smear detector means may set a smear flag upon detection of the smear, clearing the smear flag when the content of the counter means is less than the predetermined number. Then, the threshold level modifier means may modify the predetermined threshold level to the second level when the smear flag is set, returning the predetermined threshold level to the first level when the smear flag is cleared.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
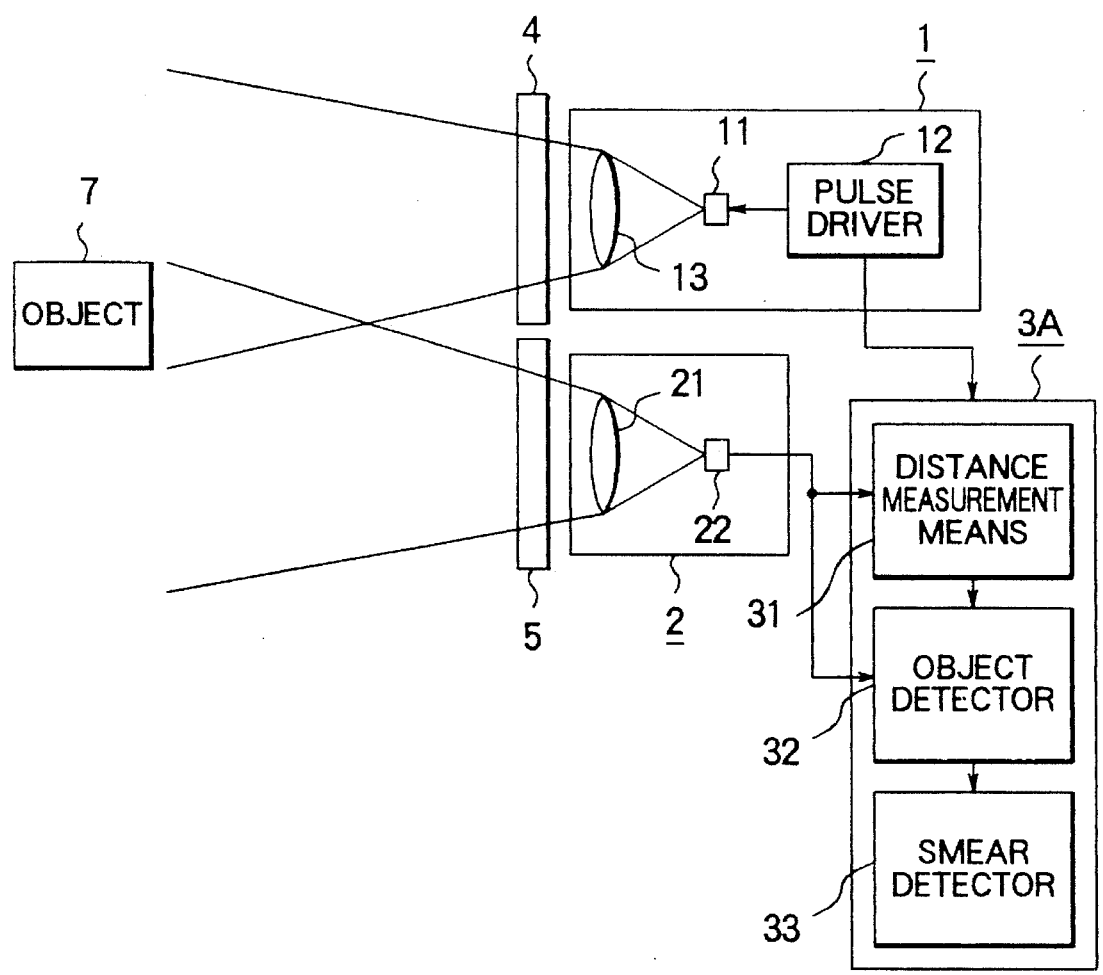
FIG. 1 is a block diagram showing an optical distance measurement apparatus including a smear detector device according to this invention.
Figure 9:
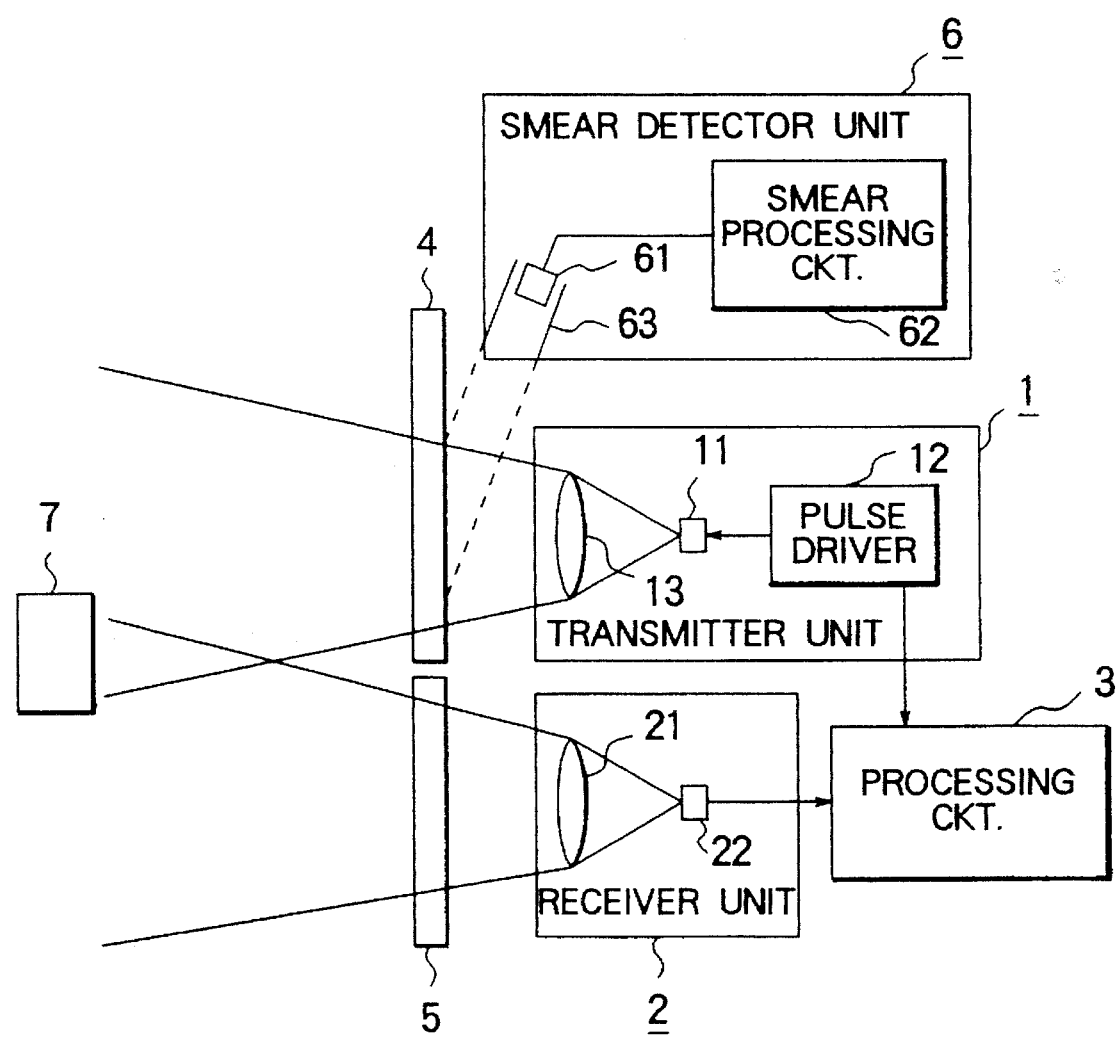
FIG. 9 is a block diagram showing a conventional smear detector device for an optical distance measurement apparatus.

FIG. 1 is a block diagram showing an optical distance measurement apparatus including a smear detector device according to this invention. In FIG. 1, the light emitter unit 1, the light receiver unit 2, the emitter window 4, and the receiver window 5 are similar to those of FIG. 9. Thus, the light emitter unit 1 includes a laser diode 11, a pulse driver circuit 12 and emitter lens 13. The laser diode 11 is driven by the pulse driver circuit 12 to generate a pulsed laser light, which is converged by the emitter lens 13 and emitted forward through the emitter window 4. The light reflected by an object 7 is received by the light receiver unit 2 including a receiver lens 21 and a light receiving element 22. The reflected light received through the receiver window 5 is converged by the receiver lens 21 upon the light receiving element 22.

The processing circuit 3A includes a distance measurement means 31, an object detector means 32 and a smear detector means 33. The distance measurement means 31 measures the time between the emission and the reception of the laser light and determines the distance to the object 7 on the basis of the measured time using the above formula. On the basis of the output level of the light receiving element 22, the object detector means 32 judges whether or not an object 7 has been detected. Further, the smear detector means 33 determines the ratio of number $C_2$ of unsuccessful measurement trials (i.e., the measurement trials by which the object 7 is not detected) and the overall number $C_1$ of measurement trials performed by the processing circuit 3A, and, on the basis of the ratio $C_2/C_1$, the smear detector means 33 determines whether or not the emitter window 4 of the light emitter unit 1 and the receiver window 5 of the light receiver unit 2 are smeared. The detail of the operation of the smear detector means 33 is described below. It is noted that the ratio $C_2/C_1$ corresponds to the frequency of unsuccessful measurements over a predetermined length of time.

Next, the principle of operation of the optical distance measurement apparatus of FIG. 1, especially that of the smear detector device according to this invention, is described.

The distance measurement means 31 of the processing circuit 3A determines the distance to the object 7 on the basis of the measurement of the round-trip time of the laser light. Namely, the distance measurement means 31 measures the round-trip time for the laser light to travel forward from the light emitter unit 1 to the object 7 and thence travel backward to the light receiver unit 2, and then calculates the distance to the object 7 using the above formula (1).

Although the light generated by the laser diode 11 is converged by the emitter lens 13, the light cone emitted from the light emitter unit 1 diverges as the light travels forward. Thus, the intensity of light radiated upon the object 7 is inversely proportional to the square of the distance between the optical distance measurement apparatus and the object 7. Similarly, the light reflected by the object 7 diverges as it travels backward to the optical distance measurement apparatus. Thus, the intensity of light received at the light receiver unit 2, relative to the intensity of light reflected by the object 7, is inversely proportional to the square of the distance between the object 7 and the optical distance measurement apparatus. As a result, the intensity of light received by the light receiver unit 2, relative to the intensity of light emitted from the apparatus, is inversely proportional to the fourth power of the distance from the optical distance measurement apparatus to the object 7.

The level of the output of the light receiving element 22 corresponds to the intensity of the received light. The object detector means 32 compares the level of the output of the light receiving element 22 with a predetermined threshold level, and, on the basis of the result of comparison, judges whether or not the object 7 is present. Thus, the detection of object 7 becomes the more difficult as the distance thereto increases.

The smear or blur upon the emitter window 4 or the receiver window 5 also affects the sensitivity of the object detection. Namely, the smear within the light emitting path, i.e., the smear upon the emitter window 4, decreases the intensity of light radiated upon the object 7. In addition, the smear within the light receiving path, i.e., the smear upon the receiver window 5, further decreases the intensity of light received by the light receiving element 22. The output of the light receiving element 22 is thus reduced and the distance that can be measured by the apparatus decreases.

To be more concrete, assume, for example, that the smear is attached uniformly upon the windows 4 and 5 of the light transmitter and receiver units 1 and 2, and the transmittivity of light through the windows 4 and 5 is reduced by 50 percent. Then, the light is reduced by 50 percent when emitted through the emitter window 4. The light reflected from the object 7 is further reduced by 50 at the receiver window 5 when received. As a result, the intensity of received light is reduced to $0.5 \times 0.5 = 0.25$ times the normal (non-smeared) level. The distance to the object 7 that can be measured by the apparatus is thus reduced to 0.7 times the normally measurable distance, 0.7 being the fourth root (biquadratic root) of 0.25. Thus, the measurable distance is reduced by 30 percent with respect to the normally measurable distance.

The measurable distance thus varies proportionally as the square root of the transmittivity of the light emitting and receiving path. (In the above case, for example, the measurable distance is reduced to 0.7 times the normal distance, which is the square root of the transmittivity, 0.5, of the light path.) The smear upon the windows 4 and 5 thus does not affect the detection of the object 7 situated at a short distance. The detection of the object 7 at a large distance, however, becomes impossible due to the smear, and, upon measurement trials, the distance measurement means 31 outputs the result only when the object 7 is at a short distance.

Assume that the optical distance measurement apparatus of FIG. 1 is mounted on the front part of a vehicle to measure periodically the distance to an arbitrary object in front, such as a vehicle running ahead or an obstacle situated in front. Then, the objects the distance to which is to be measured shall lie at random at a short and a long distance. If the smear upon the windows 4 and 5 blinds the apparatus to the objects at a larger distance, the interval of time in which no distance measurement can be made becomes longer. If the measurement is made periodically at short intervals, the ratio of the number of unsuccessful measurements (the measurements by which the object is not detected) relative to the whole number of measurement trials can be used as an index of the existence or non-existence of the smear upon the windows 4 and 5. For example, if the ratio of unsuccessful measurements is greater than or equal to 0.8, it may be judged that a significant smear is present in the optical path (i.e., is attached on the windows 4 and 5).

Figure 2:
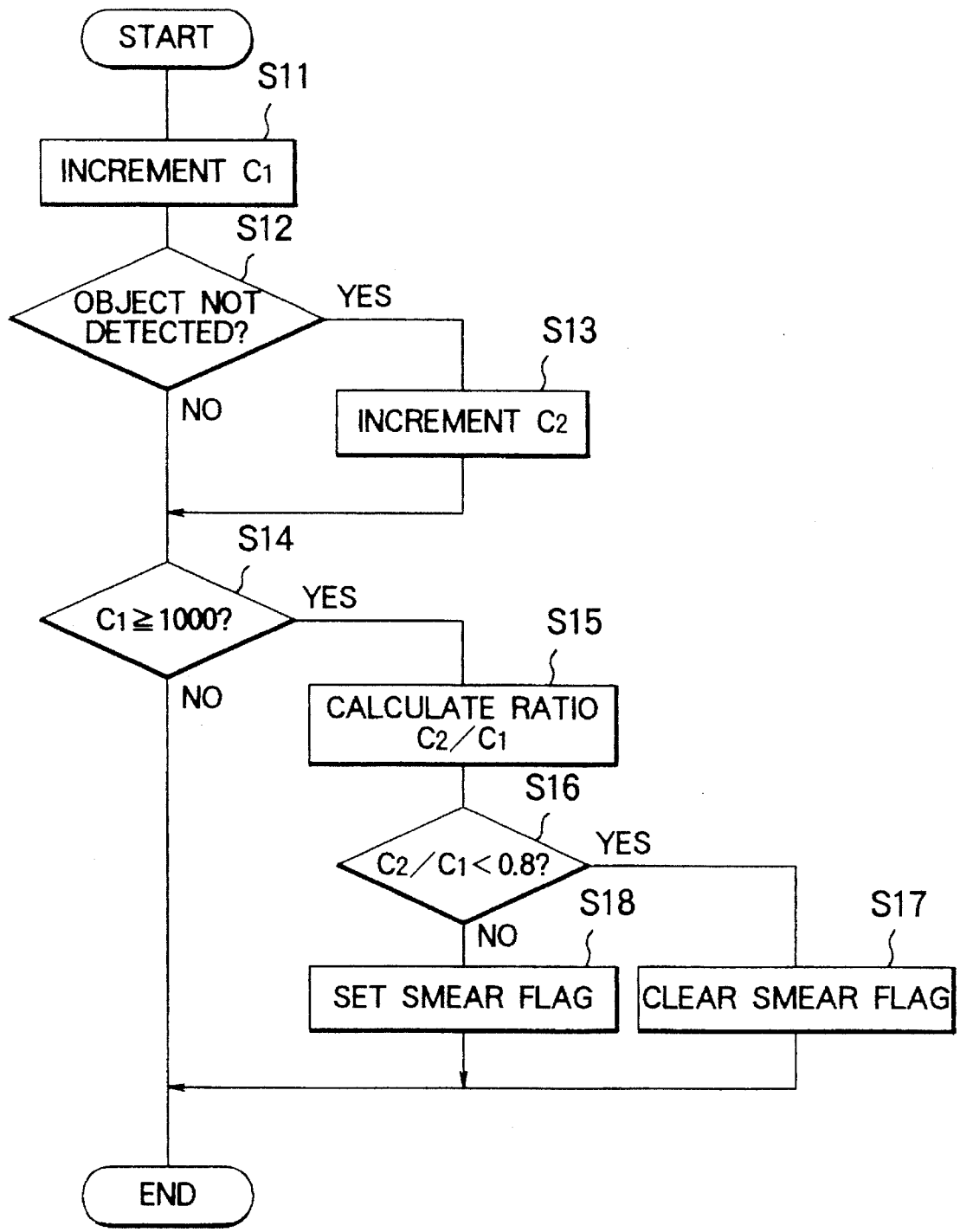
FIG. 2 is a flowchart showing the procedure followed by the apparatus of FIG. 1 for detecting the smear in the optical path.

FIG. 2 is a flowchart showing the procedure followed by the apparatus of FIG. 1 for detecting the smear in the optical path. According to the procedure of FIG. 2, measurements are made 1000 times at a fixed period (e.g., 0.1 seconds), and if the ratio of the unsuccessful trials (the measurements by which no object is detected) is greater than or equal to 0.8, the smear flag indicating the presence of smear in the optical path is set The procedure of FIG. 2 is executed repeatedly by the processing circuit 3A of FIG. 1 each 0.1 seconds.

At step S11, the first counter $C_1$ for counting the number of measurement trials is incremented. Next, at step S12, it is judged whether or not an object is detected. If the output of the light receiving element 22 is above a predetermined level, it is judged that an object is detected. Otherwise, it is judged that no object is detected. If the judgment is affirmative at step S12 (i.e., if no object is detected), the execution proceeds to step S13, where the second counter $C_2$ for counting the number of unsuccessful measurement trials is incremented. The content of the second counter $C_2$ corresponds to the length of interval, measured in units of 0.1 seconds, during which no object is detected. After step S13, the execution proceeds to step S14. On the other hand, if the judgement is negative at step S12 (i.e., if an object is detected), the execution proceeds directly to step S14.

At step S14, the first counter $C_1$ is referenced and it is judged whether or not the first counter $C_1$ is greater than or equal to 1000. Since the content of the first counter $C_1$ is incremented each 0.1 seconds, the judgment at step S14 amounts to determining whether or not the running total of the measurement time lengths is greater than or equal to 100 seconds (=0.1 seconds×1000). If the judgment is negative at step S14, the procedure of FIG. 2 is terminated, to return to step S11 in the next execution cycle. Thus, the steps S11 through step S14 are repeated 1000 times until the first counter $C_1$ becomes greater than or equal to 1000, the second counter $C_2$ being incremented upon each unsuccessful detection of an object.

When the judgment at step S14 finally becomes affirmative (i.e., $C_1 \geq 1000$), the execution proceeds to step S15, where the ratio $C_2/C_1$ of the two counters is calculated. The ratio $C_2/C_1$ corresponds to the ratio of the length of unsuccessful measurement intervals relative to the total length of measurement time. The ratio $C_2/C_1$ is thus an index of whether or not a significant amount of smear is present in the optical path. Thus, at step S16, it is judged whether or not the ratio $C_2/C_1$ is less than 0.8. If the judgment is affirmative at step S16 (i.e., if $C_2/C_1<0.8$), the execution proceeds to step S17, where the smear flag is cleared to indicate that the smear is negligible. On the other hand, if the judgment is negative at step S16 (if $C_2/C_1 \geq 0.8$), the execution proceeds to step S18, where the smear flag is set to indicate that a significant smear is present and the measurement capability of the apparatus is deteriorated.

In the above description, the procedure of FIG. 2 is executed each 0.1 seconds, and the smear flag is set each 100 seconds (=0.1×1000). The measurement period (i.e., 0.1 seconds) and the total number of measurements (i.e., 1000) are given as exemplary values and can be modified to best suit a particular application. Further, the time length of unsuccessful measurements or that of the total length of measurement trials may be measured directly by means of timers. Furthermore, the threshold level of smear detection (i.e., the threshold level 0.8 used at step S16) may also be modified to be suited to a particular application.

Figure 3:
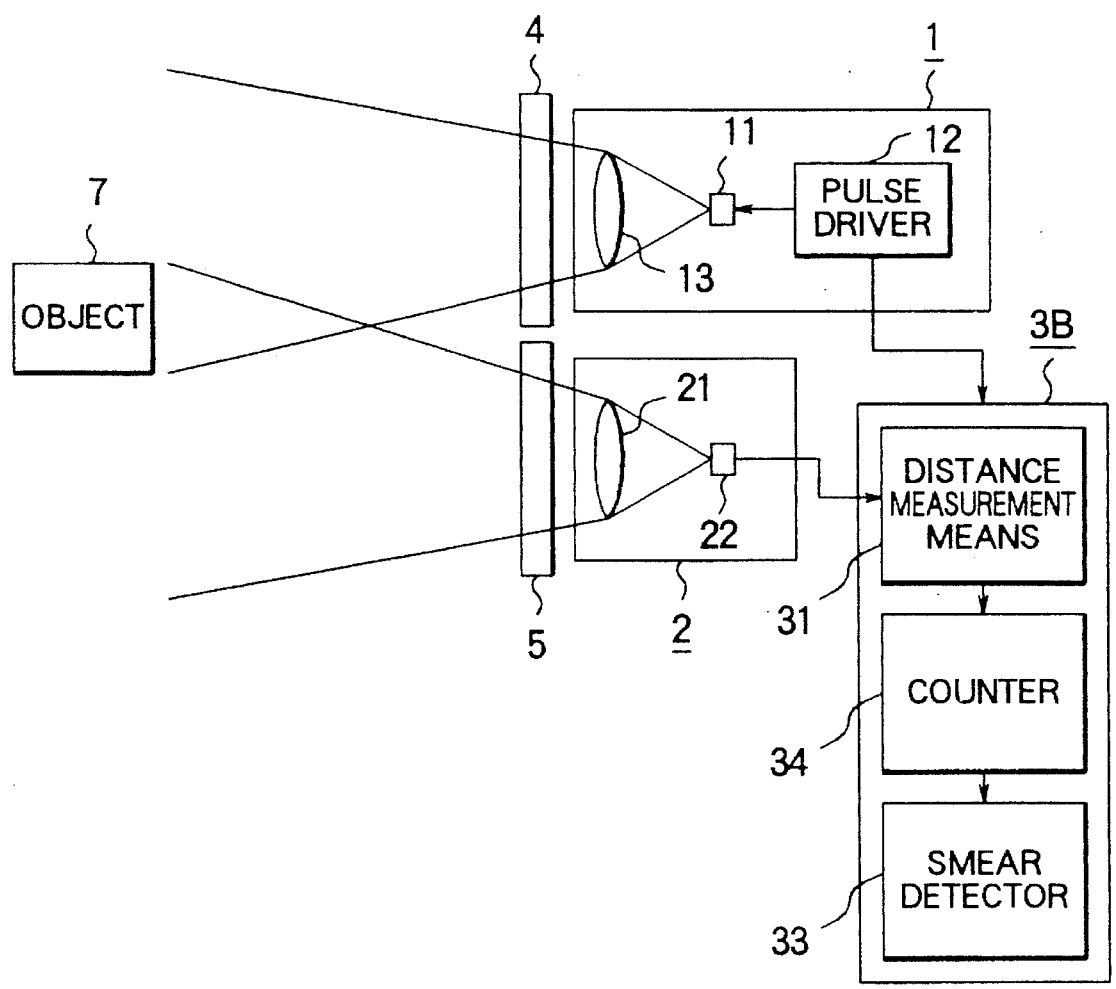
FIG. 3 is a block diagram showing an optical distance measurement apparatus including another smear detector device according to this invention.
Figure 4:
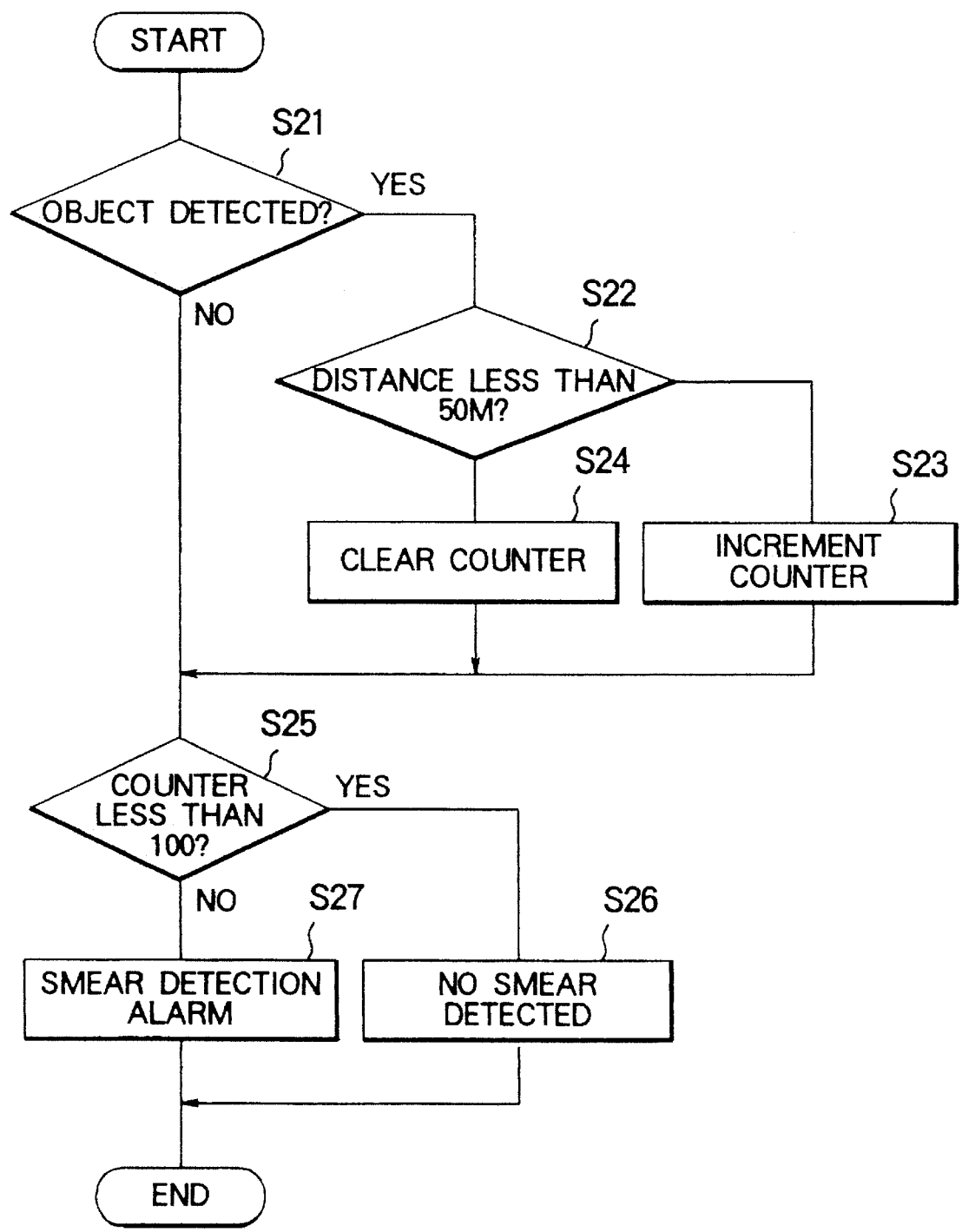
FIG. 4 is a flowchart showing the procedure followed by the apparatus of FIG. 3 for detecting the smear in the optical path.

FIG. 3 is a block diagram showing an optical distance measurement apparatus including another smear detector device according to this invention. FIG. 4 is a flowchart showing the procedure followed by the apparatus of FIG. 3 for detecting the smear in the optical path. When the smear in the optical path exceeds a predetermined level, the objects at more than a predetermined distance (e.g., 50 meters) can no longer be detected. Thus, according to the embodiment of FIG. 3, the smear detection alarm is generated when the detected distance is less than 50 meters successively for 100 times (without interruption by measurements a distance greater than or equal to 50 meters).

The optical distance measurement apparatus of FIG. 3 is similar to that of FIG. 1, except for the structure of the processing circuit 3B, which includes a counter 34 as well as a distance measurement means 31 and a smear detector means 33. The procedure of FIG. 4 is repeated 100 times, for example, at each 0.1 seconds.

At step S21, it is judged whether or not an object is detected. If the judgment is negative at step S21 (i.e., if no object is detected), the execution proceeds directly to step S25. On the other hand, if the judgment is affirmative at step S21, the execution proceeds to step S22, where the distance to the object 7 is measured and it is judged whether or not the distance is less than 50 meters. If the judgment is affirmative at step S22 (if the measured distance is less than 50 meters), the execution proceeds to step S23, where the counter C 34 for storing the successive number of measurements of a distance less than 50 meters is incremented. On the other hand, if the judgment is negative at step S22, the execution proceeds to step S24, where the counter C is cleared (i.e., reset to zero).

At step S25, it is judged whether or not the counter C is less than 100. If the counter C is less than 100, it may be the case that the successive measurements of a distance less than 50 meters, the number of which is stored in the counter C, have occurred only by chance, and hence a distance greater than or equal to 50 meters can still be detected in the future. Thus, if the judgment is affirmative at step S25 (i.e., if C<100), the execution proceeds to step S26, where no smear is detected. On the other hand, if the judgment is negative at step S25 (i.e., if $C \geq 100$), the execution proceeds to step S27, where the smear detection alarm is generated by means of an alarm means (not shown).

Thus, the apparatus of FIG. 3 detects the smear when the measured distance is less than 50 meters successively for 100 times. The threshold level of the distance (i.e., 50 meters) and the threshold level (i.e., 100 times) of the uninterrupted distance measurements of a distance less than the threshold level may be modified in accordance with the desired response speed and the precision of the smear detection.

Figure 5:
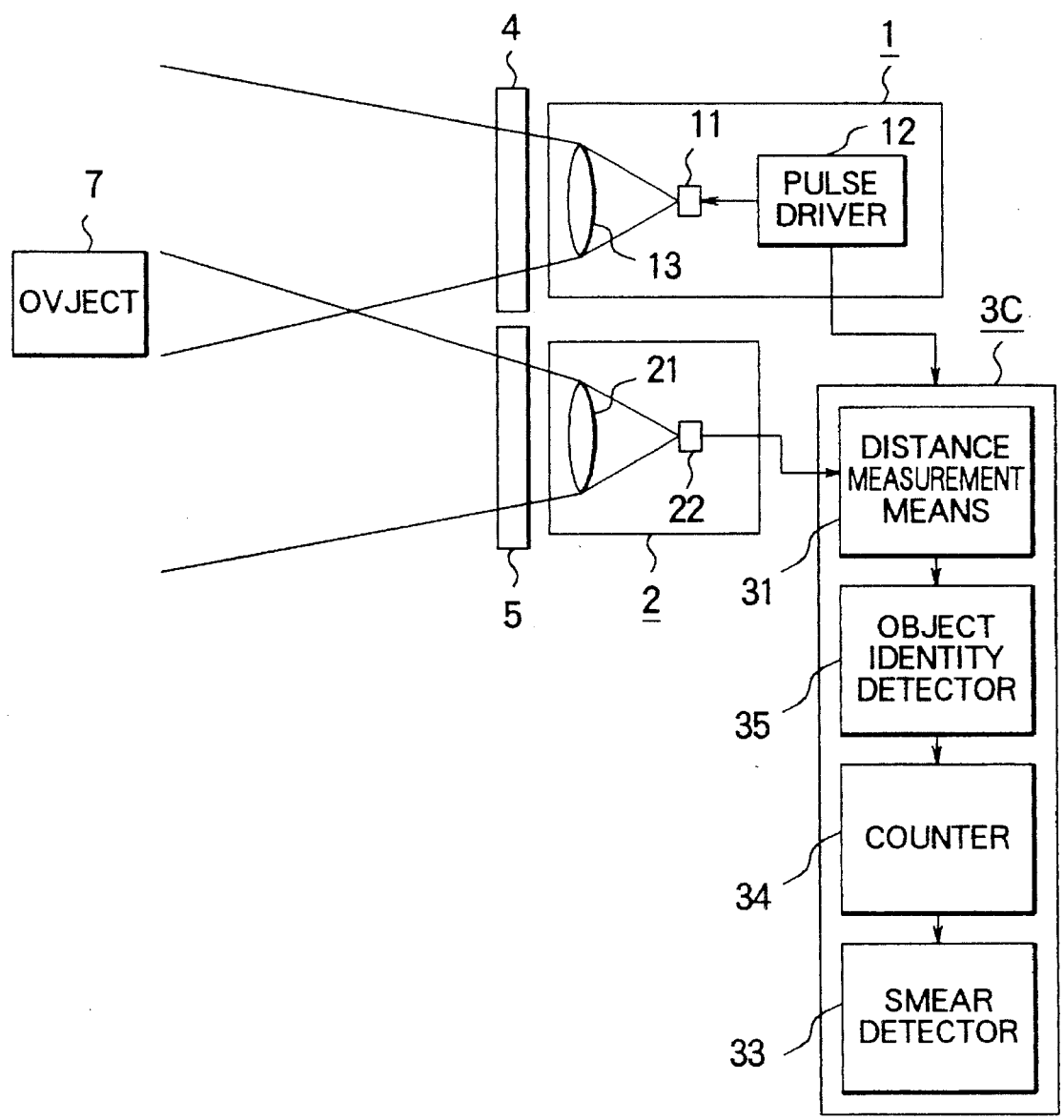
FIG. 5 is a block diagram showing an optical distance measurement apparatus including still another smear detector device according to this invention.
Figure 6:
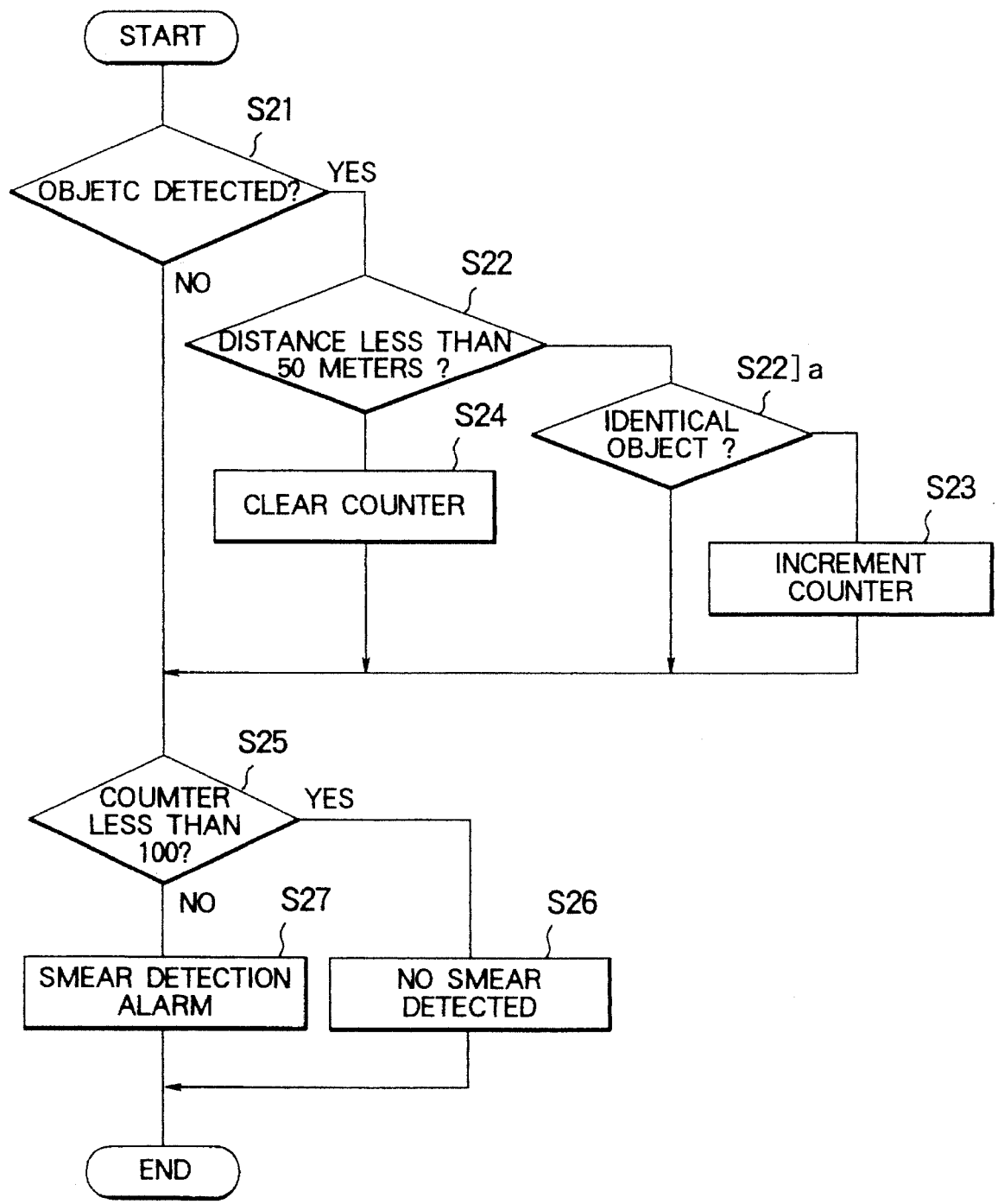
FIG. 6 is a flowchart showing the procedure followed by the apparatus of FIG. 5 for detecting the smear in the optical path.

FIG. 5 is a block diagram showing an optical distance measurement apparatus including still another smear detector device according to this invention. FIG. 6 is a flowchart showing the procedure followed by the apparatus of FIG. 5 for detecting the smear in the optical path. The optical distance measurement apparatus of FIG. 5 is similar to that of FIG. 3 except that the processing circuit 3C includes an object identity detector 35 as well as a distance measurement means 31, a counter 34, and a smear detector means 33.

The object identity detector 35 determines whether or not the object 7 the distance to which is measured in the current measurement cycle is identical to the object 7 the distance to which is measured in the preceding measurement cycle. Assume that the object 7 the distance to which is measured is an object situated in front (e.g., the vehicle running ahead) of the vehicle on which the optical distance measurement apparatus is mounted. Assume further that the relative speed of the object 7 with respect to the optical distance measurement apparatus is constant and the measurements are made at a fixed period (e.g., at 0.1 seconds). Then, the variation of the relative movement of the object 7 over the current and preceding measurement cycle is usually negligibly small provided that the currently measured object 7 is identical to the object 7 of the preceding measurement cycle. If, on the other hand, the current object 7 is not identical to the preceding object 7, the variation of the relative movement of the object 7 over the current and preceding measurement cycle deviates substantially from zero. Thus, the object identity detector 35 determines that the object 7 of the current measure cycle is identical to that of the preceding measurement cycle if the variation of the relative movement of the object 7 over the current and preceding measurement cycle is zero (or negligibly small). In the case of this embodiment, the distance is measured at each 0.1 seconds.

The variation of the relative movement of the object 7 over the current and preceding measurement cycle may be determined as follows. Let the current and the preceding measurement of the distance to the object 7 be represented by $D_n$ and $D_{n-1}$, respectively. Then, the relative movement of the object 7 for the current measurement cycle may be given by the difference: $(D_n-D_{n-1})$. Further, let the measurement immediately preceding the measurement $D_{n-1}$ be represented by $D_{n-2}$. Then the relative movement of the object 7 for the preceding measurement cycle may be given by the difference: $(D_{n-1}-D_{n-2})$. Thus, the variation of the relative movement of the object 7 over the current and the preceding measurement cycle may be given by:

$$(D_n-D_{n-1})-(D_{n-1}-D_{n-2}).$$

The procedure of FIG. 6 is similar to that of FIG. 4 except for the inclusion of the step S22a after the affirmative judgment at step S22. Thus, if the judgment is affirmative at step S22 (i.e., if the measured distance is less than 50 meters), the execution proceeds to step S22a, where the object identity detector 35 judges whether or not the object 7 the distance to which is measured in the current measurement cycle is identical to the object 7 the distance to which is measured in the preceding measurement cycle. If the judgment is negative at step S22a (if the object 7 is not identical), the execution proceeds to step S23 where the counter C 34 is incremented. If the judgment is affirmative at step S22a, the execution proceeds directly to step S25. The steps S21 through S27 other than the step S22a are the same as those of FIG. 4.

Thus, according to the procedure of FIG. 6, the counter 34 is incremented only when the distance to an object different from the previously measured object is less than 50 meters. If the current object 7 is identical to the preceding object, the counter 34 is not incremented. Thus, even if the distance to one and the same object 7 situated at less than 50 meters is measured repeatedly for a prolonged period of timer the counter 34 is not incremented and hence an erroneous smear detection alarm is not generated at step S27.

Figure 7:
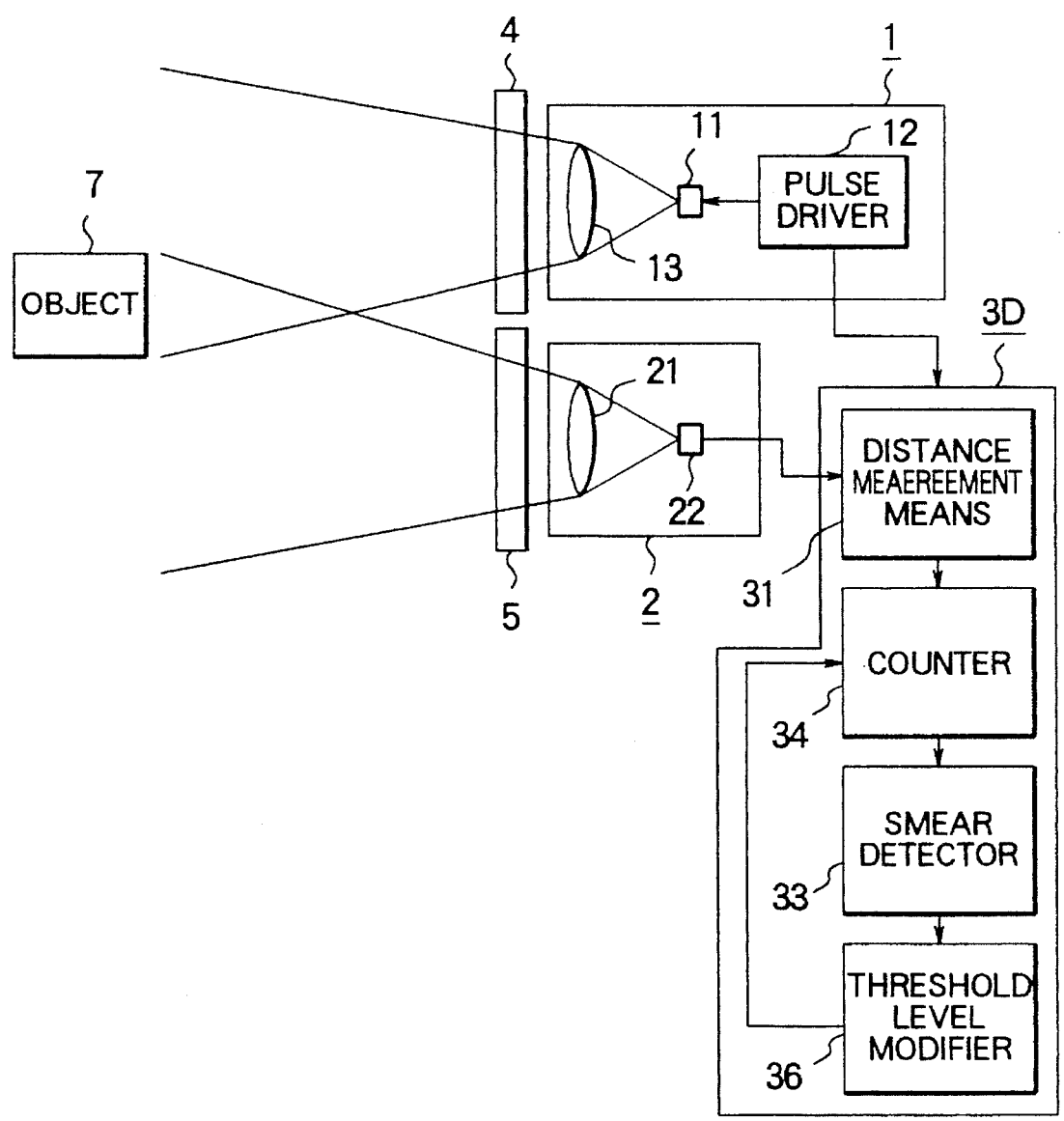
FIG. 7 is a block diagram showing an optical distance measurement apparatus including still another smear detector device according to this invention.
Figure 8:
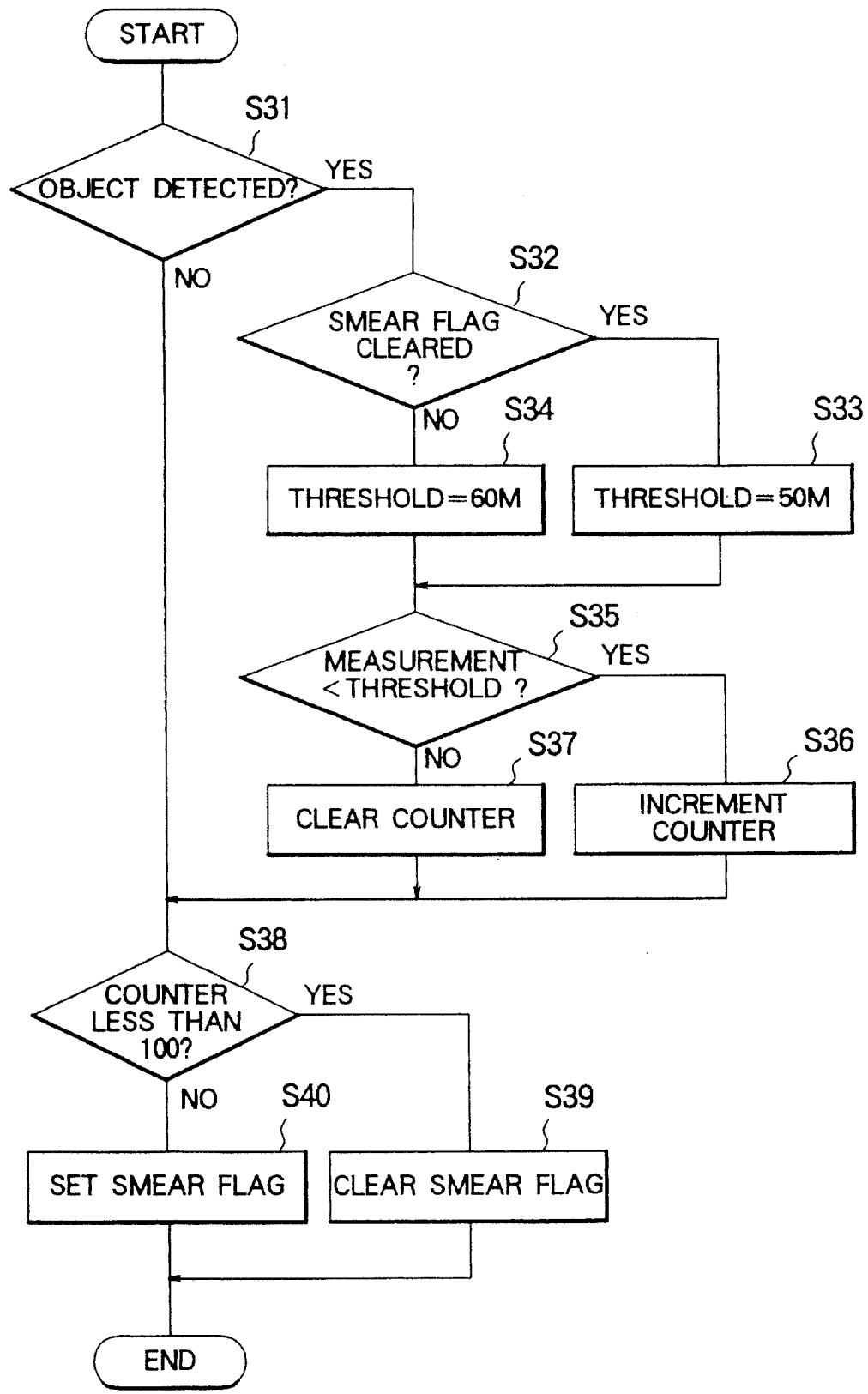
FIG. 8 is a flowchart showing the procedure followed by the apparatus of FIG. 7 for detecting the smear in the optical path.

FIG. 7 is a block diagram showing an optical distance measurement apparatus including still another smear detector device according to this invention. FIG. 8 is a flowchart showing the procedure followed by the apparatus of FIG. 7 for detecting the smear in the optical path.

The optical distance measurement apparatus of FIG. 7 is similar to that of FIG. 3 except that the processing circuit 3D includes a threshold level modifier means 36 as well as a distance measurement means 31, a smear detector means 33, and a counter 34. Further, the procedure of FIG. 8 is similar to that of FIG. 4, where the steps S31, S32, and steps S35 through S40 of FIG. 8 corresponds respectively to the steps S21 through S27 of FIG. 4.

However, at step S39 and step S40 in FIG. 8, the smear flag is cleared and set, respectively, in accordance with the result of the judgment at step S38. Namely, at step S38, it is judged whether or not the counter 34 is less than 100, and if the judgment is affirmative (i.e., if the content of the counter 34 is less than 100), the execution proceeds to step S39, where the smear flag for indicating the detection of smear is cleared. On the other hand, if the judgment is negative at step S38, the execution proceeds to step S40, where the smear flag is set. Further, after an affirmative judgment at step S31, the distance threshold level is modified at steps S32 through S34 before proceeding to step S35. Namely, at step S32, the threshold level modifier means 36 judges whether or not the smear flag is cleared. If the judgment is affirmative at step S32 (i.e., if the smear flag is cleared), the execution proceeds to step S33, where the threshold level used at the subsequent step S35 is assigned the first value of 50 meters. On the other hand, if the judgment is negative at step S32, the execution proceeds to step S34, where the threshold level used at the subsequent step S35 is assigned the second value of 60 meters. At step S35, it is judged whether or not the measured distance is less than the threshold level selected at step S33 or step S34.

Thus, in accordance with the procedure of FIG. 8, the threshold level used at step S35 remains equal to 50 meters until the content of the counter 34 reaches 100 and the smear flag is set. When, however, the smear flag is once set at step S40, the threshold level used at the judgment at step S35 is increased to 60 meters, such that the counter 34 is cleared at step S37 only when a distance greater than or equal to 60 meters is measured successfully. Consequently, when once set, the smear flag is cleared only when a distance greater than or equal to 60 meters is measured successfully.

The modification of the threshold level from the first (i.e., 50 meters) to the second level (i.e., 60 meters) upon setting of the smear flag provides a hysteresis characteristic for setting and resetting the smear flag. Assume for example that a distance slightly above the first threshold level (e.g., 52 meters) is measured temporarily after the smear flag is set. If the threshold level is not modified, the smear flag is immediately cleared by the measurement. Thus, the smear flag may fluctuate between the set and the cleared state. However, in accordance with the procedure of FIG. 8, the threshold level is modified to a second level (i.e., 60 meters) greater than the first level (i.e., 50 meters) by a predetermined margin. Thus, the measurement of a distance slightly above the first threshold level (e.g., 52 meters) does not clear the smear flag. The detection of the smear is thus stabilized.

The second threshold level, however, is low enough for clearing the smear flag upon removal of the smear. Thus, assume that, after the smear flag is set, the smear is cleared manually or is washed away by the rain. Then, a distance greater than or equal to 60 meters again becomes measurable and the judgment at step S35 soon becomes negative (i.e., the measurement becomes greater than or equal to the second threshold level), thereby clearing the counter 34. The judgment at step S38 thus becomes affirmative and the smear flag is cleared at step S39. Thereafter, the judgment at step S32 becomes affirmative, and the threshold level returns to the first level (i.e., 50 meters).

The parameters of the procedure of FIG. 8, such as the first and the second threshold levels used at step S35, may be modified to suit the application in accordance with the desired response speed and the precision. For example, if the number of the successive measurements of a distance less than the first threshold level, used at step S38 for setting the smear flag, is increased, the reliability of the smear detection is enhanced.

What is claimed is:

1. An optical distance measurement apparatus comprising:

light transmitter means for radiating light toward an object a distance to which is to be measured;

light receiver means for receiving said light radiated from said light transmitter means and reflected by said object, said light receiver means generating a signal corresponding to a received light;

distance measurement means, coupled to said light transmitter means and said light receiver means, for determining a distance to said object periodically on the basis of a round-trip time of said light travelling forward from said light transmitter means to said object and backward from said object to said light receiver means;

object detector means, coupled to said light receiver means, for determining whether or not an object is detected on the basis of a level of said signal output from said light receiver means; and smear detector means, coupled to said object detector means, for calculating a ratio of a number of measurements by which said object is not detected to a total number of measurements made periodically by said distance measurement means over a predetermined length of time, wherein said smear detector means detects a smear when said ratio is greater than or equal to a predetermined level.

2. An optical distance measurement apparatus comprising:

light transmitter means for radiating light toward an object a distance to which is to be measured;

light receiver means for receiving said light radiated from said light transmitter means and reflected by said object, said light receiver means generating a signal corresponding to a received light;

distance measurement means, coupled to said light transmitter means and said light receiver means, for determining a distance to said object periodically on the basis of a round-trip time of said light travelling forward from said light transmitter means to said object and backward from said object to said light receiver means;

counter means, coupled to said distance measurement means, for storing a number of successive measurements of a distance less than a predetermined threshold level, said measurements being performed by said distance measurement means; and smear detector means, coupled to said counter means, for detecting a smear when a content of said counter means becomes greater than or equal to a predetermined number.

3. An optical distance measurement apparatus as claimed in claim 2, further comprising:

an object identity detector for determining whether or not a first object a distance to which is measured in a current measurement cycle by said distance measurement means is identical to a second object a distance to which is measured by said distance measurement means in an immediately preceding measurement cycle;

wherein said counter means is further coupled to said object identity detector and is incremented upon each successive measurement of a distance less than said predetermined threshold level only if said object identity detector determines that said first object is not identical to said second object.

4. An optical distance measurement apparatus as claimed in claim 3, wherein said object identity detector determines that said first object is identical to said second object if and only if a variation of a relative movement of said first and second object with respect to said optical distance measurement apparatus over said current and said preceding measurement cycle is substantially equal to zero.

5. An optical distance measurement apparatus as claimed in claim 2, further comprising:

threshold level modifier means, coupled to said smear detector means, for modifying said predetermined threshold level from a first to a second level greater than said first level when said smear detector means detects said smear.

6. An optical distance measurement apparatus as claimed in claim 5, wherein:

said smear detector means sets a smear flag upon detection of said smear, said smear detector means clearing said smear flag when said content of said counter means is less than said predetermined number; and said threshold level modifier means modifies said predetermined threshold level to said second threshold level when said smear flag is set, said threshold level modifier means returning said predetermined threshold level to said first level when said smear flag is cleared.

* * * * *